(No Model.) 2 Sheets—Sheet 1.
D. C. W. HARDISON.
COTTON OR CORN PLANTER.
No. 412,253. Patented Oct. 8, 1889.
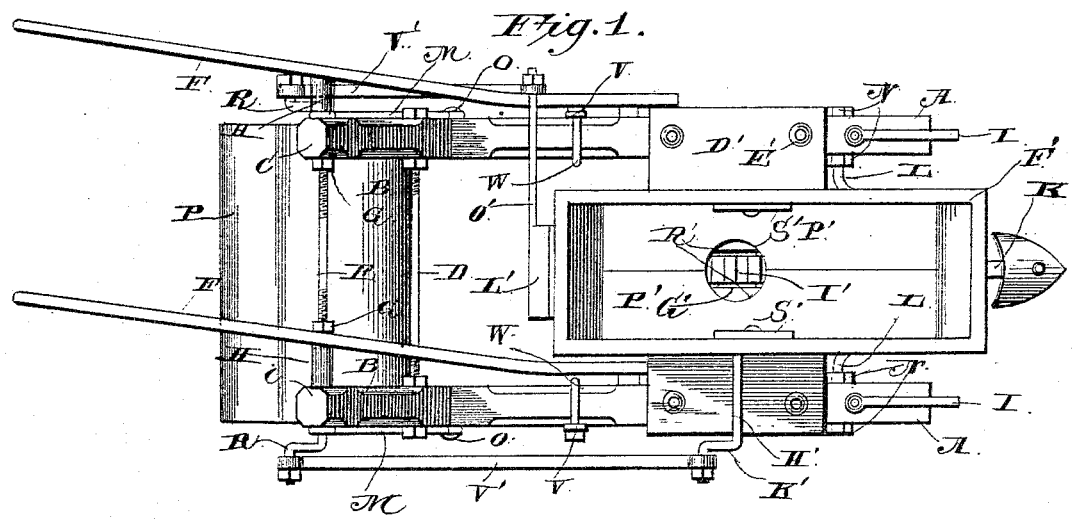
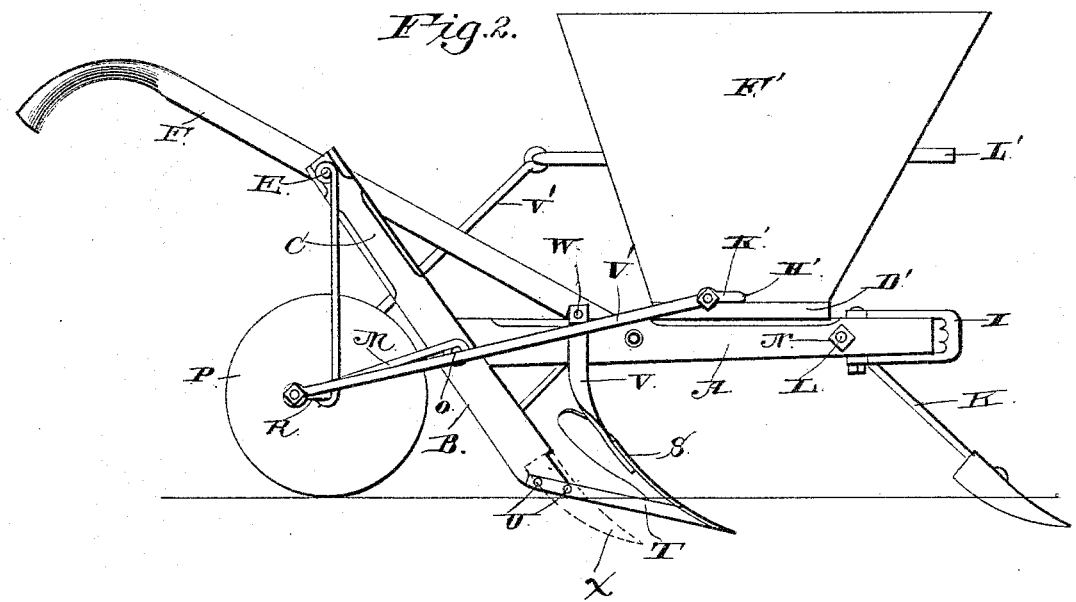
Witnesses
M. Fowler
E. Siggers
Inventor
D. C. W. Hardison
By his Attorneys
C. A. Knowles (No Model.) 2 Sheets—Sheet 2.
D. C. W. HARDISON.
COTTON OR CORN PLANTER.
No. 412,253. Patented Oct. 8, 1889.
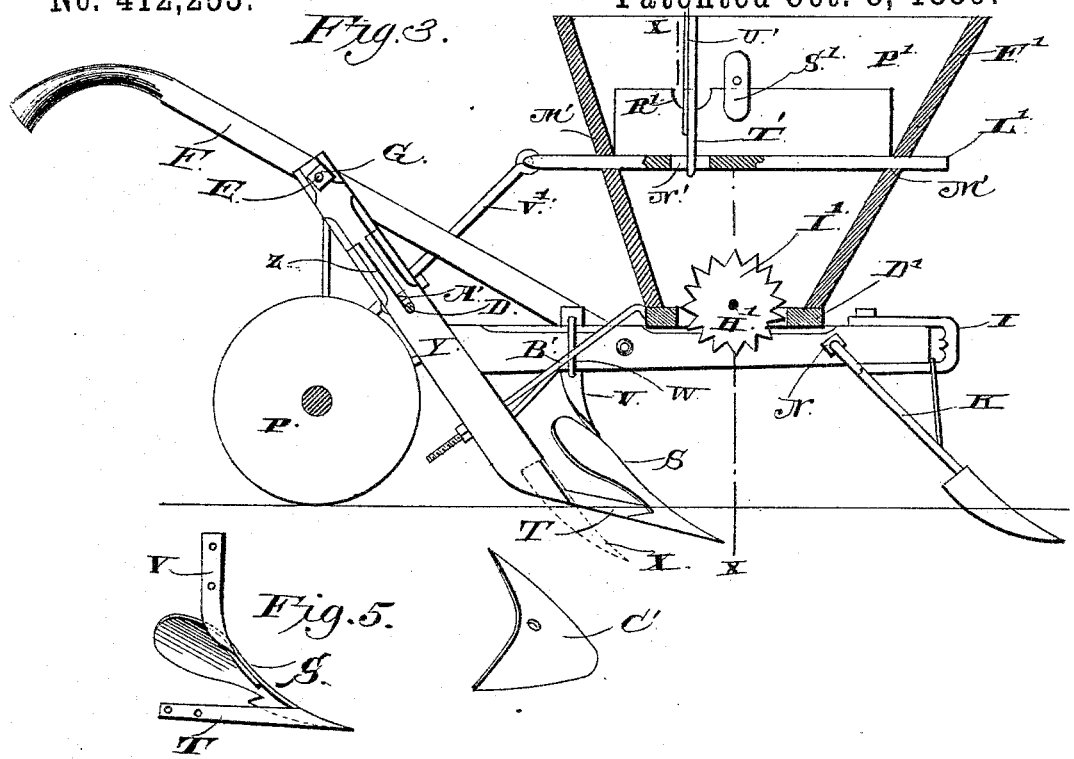
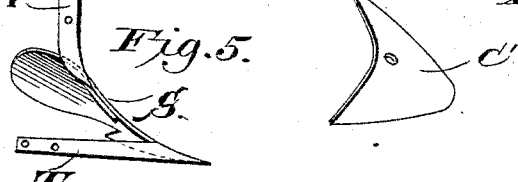
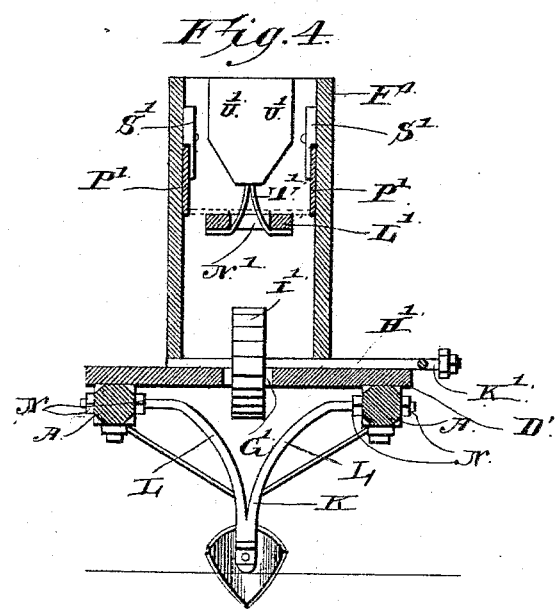
Witnesses
M. Fowler
E. G. Siggers
Inventor
D.C.W. Hardison
By his Attorneys

UNITED STATES PATENT OFFICE.

DOCK C. W. HARDISON, OF EAGLE LAKE, TEXAS.

COTTON OR CORN PLANTER.

SPECIFICATION forming part of Letters Patent No. 412,253, dated October 8, 1889.

Application filed September 12, 1888. Serial No. 285,191. (No model.)

*To all whom it may concern:*

Be it known that I, DOCK C. W. HARDISON, a citizen of the United States, residing at Eagle Lake, in the county of Colorado and State of Texas, have invented a new and useful Improvement in Cotton or Corn Planters, of which the following is a specification.

My invention relates to an improvement in cotton and corn planters and cultivators; and it consists in the peculiar construction and combination of devices, that will be more fully set forth hereinafter, and particularly pointed out in the claims.

In the accompanying drawings, Figure 1 is a plan view of my invention. Fig. 2 is a side elevation of the same. Fig. 3 is a vertical central longitudinal sectional view of the same. Fig. 4 is a vertical transverse sectional view of the same, taken on the line $x\,x$ of Fig. 3. Fig. 5 is a detail view of one of the turning plows.

A represents a pair of plow-beams, to the rear ends of which are secured inclined standards B, the upper ends of which project above the beams A and form arms C. The said plow-beams are arranged side by side, and are connected together by a pair of cross-rods D E, which pass transversely through the arms C, near the middle and upper ends thereof.

F represents a pair of handles, which are similar to the usual plow-handles, and have their lower ends bolted to the beams A and their upper ends secured on the cross-rod E. The said plow-handles are curved diagonally to one side, as shown in Fig. 1, so that the plowman or operator can walk to one side of the furrow. The said rods D and E are provided with screw-threads and with adjusting nuts and washers G H, respectively, whereby the plow-beams may be moved laterally toward and from each other, and may be secured at any desired distance apart. Each of the plow-beams is provided at its front end with a clevis I.

K represents a plow-standard, which is V-shaped, as shown, and is provided with oppositely-extending arms L, which pass through transverse openings of the plow-beams, and are screw-threaded and provided with nuts N, which bear against opposite sides of the beams, and thereby enable the beams to be adjusted with relation to said standards K.

M represents a pair of right-angled brackets, which have the ends of their arms secured on the outer sides of the standards B, the upper ends of said brackets being secured on the cross rod or bar E, and the lower ends thereof being secured by bolts O, which project from the said standards, and in the angle of the said brackets are bearings, in which is journaled the shaft of a roller P. The ends of the said shaft are provided with cranks R.

S represents a pair of turning plows, which are provided at their landsides with rearwardly-extending arms T, that are adapted to be secured to either side of the standards B at the heels thereof by means of bolts U, and the said plows are further provided on their landsides with upwardly-extending arms V, which are adapted to bear against either side of the beams A and are secured thereto by means of clip-bolts W. The said turning plows are, by means of this construction and arrangement of devices, adapted to be reversed or placed in such relation on the beams that they may be caused to throw their furrows either inward or outward.

X represents shovels or cultivating-plows, which are adapted to be secured to the standards B in lieu of the turning plows.

Y represents a plow-standard, which is provided in its upper end with a transverse longitudinal open slot Z, which is adapted to receive the cross-bar D. A bolt A' passes through the upper end of the standard Y at right angles to the said slot Z, and serves to detachably secure the standard to the cross-bar. From the lower end of the standard Y projects a brace-rod B', the function of which is to secure the standard Y rigidly in position at any desired angle. The lower end of the said standard is adapted for the attachment either of a shovel X or a bull-tongue C', as will be readily understood.

The plow-standard Y, which is employed only when the machine is used as a cultivator, may, owing to the manner of constructing and securing it as herein described, be readily detached when the machine is to be used in planting. It will also be obvious that I do not limit myself to the use of a single supplemental standard Y, as two will be the number usually employed.

I will now proceed to describe my improved planting mechanism, which is adapted to be used in connection with a plow for planting cotton or corn.

D' represents a base-board which is arranged transversely on the beams A, and secured thereto by means of bolts E', whereby the said board may be detached from the said beams. On the upper side of the board, at the center thereof, is secured a hopper F', the front and rear sides of which converge downward, as shown. In the center of the board D' is a transverse opening G', which communicates with the bottom of the hopper.

H' represents a shaft, which is arranged transversely in the hopper, near the bottom thereof, is journaled in bearings in the sides of the hopper, and is provided with a tooth-edged seed-wheel I', which is rigidly secured to the said shaft and has its lower side projecting through the opening G'. One end of the said shaft is provided with a crank K'.

L' represents a seed-slide, which extends longitudinally through the hopper at a suitable distance from the bottom thereof, and is guided in openings M' in the front and rear sides of the hopper. The said seed-slide is provided at its center with one or a suitable number of openings N', and from the rear end of the said slide projects an arm O', which is arranged at right angles thereto.

P' represents a pair of doors, which are hinged to the sides of the hopper, and are adapted to fold downward onto the seed-slide or to be turned upward to a vertical position and caused to bear against the sides of the hopper. In the opposing edges of the said doors is an opening R', with which the opening N' of the seed-slide is adapted to register once at each stroke of the seed-slide. Buttons S' are arranged against the inner sides or the hopper, and are pivoted thereto. The said buttons are adapted to turn down upon the doors P' when the latter are arranged over the seed-slide, so as to lock the said doors in this position, and are adapted to engage the outer sides of the doors or plates P' when the latter are arranged in their vertical position, as will be readily understood.

T' represents a vertical stirring-arm, which is adapted to have its lower end inserted and secured in the opening N' of the seed-slide, and from the said stirring-arm project a pair of outwardly-extending spurs or wings U'.

V' represents pitmen, which are adapted to connect the cranks R of the roller with the crank of the rock-shaft H' or with the arm O' of the seed-slide, so that either the shaft H' or the seed-slide may be operated by the rotation of the roller when the machine is being drawn across a field.

When it is desired to use the machine for planting cotton, the doors P' are turned upward and caused to bear against the sides of the hopper and secured by the buttons S', and the stirrer T' has its lower end secured to the seed-slide and is caused to reciprocate therewith. The width of the seed-slide is considerably less than the width of the hopper, and thereby openings are left between the sides of the seed-slide and the sides of the hopper, through which the cotton-seeds placed in the upper portion of the hopper can very readily drop into the lower compartment of the hopper in which the seed-wheel is located. Reciprocating movement of the seed-slide and of the stirring-arm prevents the seeds from lodging in the hopper and causes the same to drop into the lower compartment thereof, and the seed-wheel therein forces the seeds through the opening G' and causes them to drop into the furrow made by the shovel attached to the V-shaped plow-standard K. The plows attached to the standards B serve to cover the seeds and to form ridges over them, as will be very readily understood.

In order to adapt the machine for use as a corn-planter, I remove the stirrer T' and fold the doors P' down over the seed-slide. The said doors P' are thus caused to form the bottom of the compartment in which the corn is placed, and as the seed-slide operates, its opening—once at each stroke of the slide—is caused to register with the opening R', and thereby drop the seeds into the furrow.

Having thus described my invention, I claim—

1. The combination of the plow-beams, the standards secured to said plow-beams and having arms C C, the transverse rods D E, connecting said arms, the adjusting-nuts on said rods, the standard K, having arms L extending transversely through the beams, and the adjusting-nuts N N on said arms, all combined and operating substantially as set forth.

2. The combination of the plow-beams having the standards provided with the arms C, the transverse rods connecting the said arms, the brackets secured to the said arms, and the roller having its shaft journaled in bearings in the said brackets, substantially as described.

3. The combination, in a planter, of the hopper, the shaft H', journaled therein and having the seed-wheel I', the reciprocating slide guided in the hopper and arranged at a distance above the bottom thereof, the width of the said slide being less than the width of the hopper, and the doors or plates P', hinged to the sides of the hopper and adapted to fold downward over the seed-slide, said doors or plates having the opening R', substantially as described.

4. The combination of the hopper, the shaft H', journaled therein and having the seed-wheel I', the seed-slide arranged in the hopper at a distance above the seed-wheel, the said slide being of less width than the hopper, the door or plates P', hinged to the sides of the hopper and adapted to be folded down upon the seed-slide, the buttons S', pivoted to the sides of the hopper and adapted to lock the doors or plates in place, and means, substantially as set forth, to rotate the wheel H' and reciprocate the seed-slide, substantially as described.

In testimony that I claim the foregoing as my own I have hereto affixed my signature in presence of two witnesses.

DOCK C. W. HARDISON.

Witnesses:
A. J. NAVE,
FRANK O. NORRIS.